Sept. 9, 1958           E. BAUER           2,850,805
GAUGING DEVICE
Filed Dec. 20, 1955           3 Sheets-Sheet 1
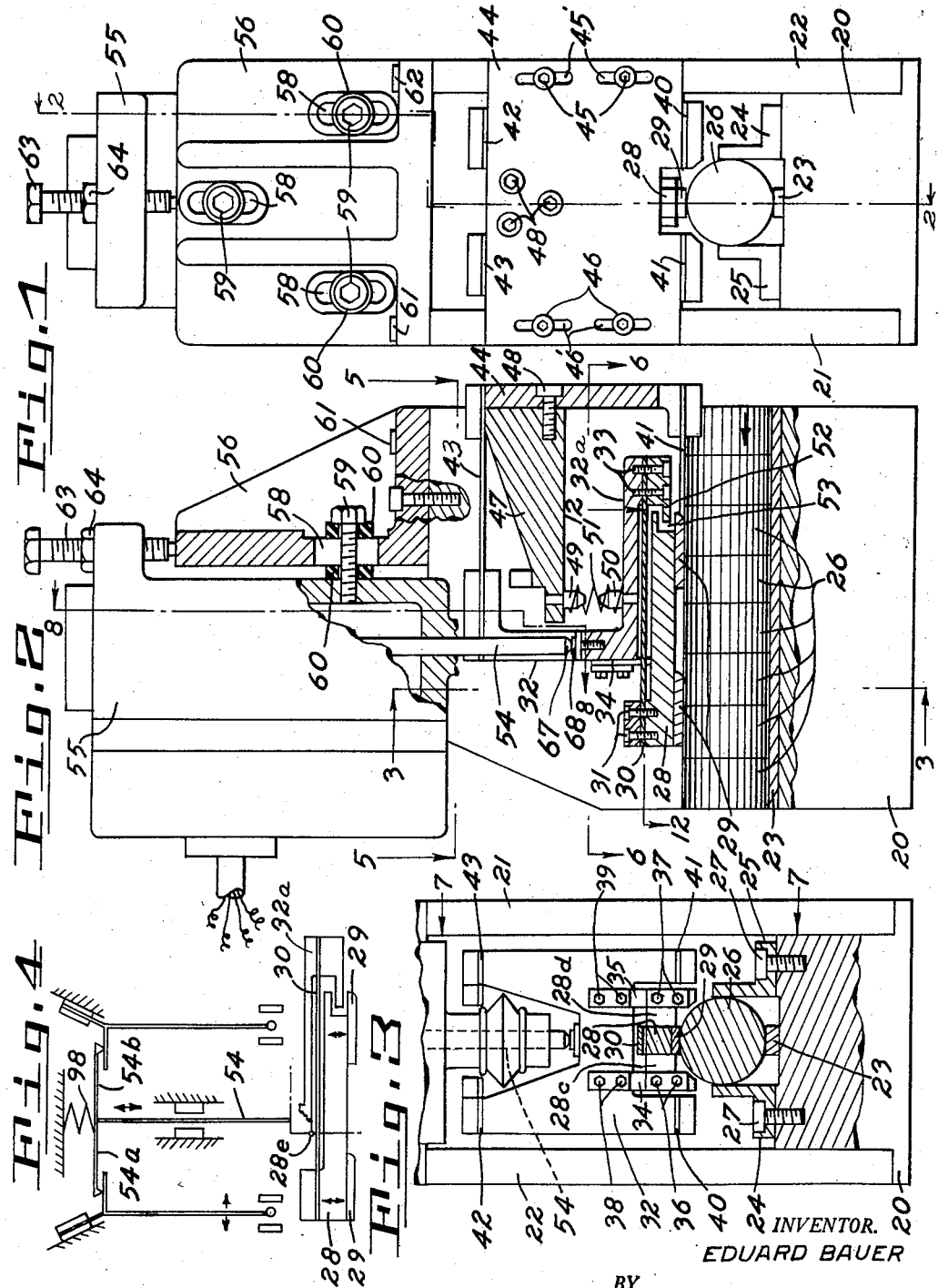
INVENTOR.
EDUARD BAUER
BY
H. N. Parsons & L. N. Wright
ATTORNEYS.

Sept. 9, 1958  E. BAUER  2,850,805
GAUGING DEVICE
Filed Dec. 20, 1955  3 Sheets-Sheet 2
Fig. 5
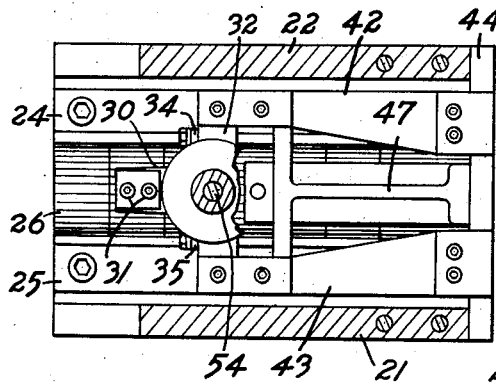
Fig. 6
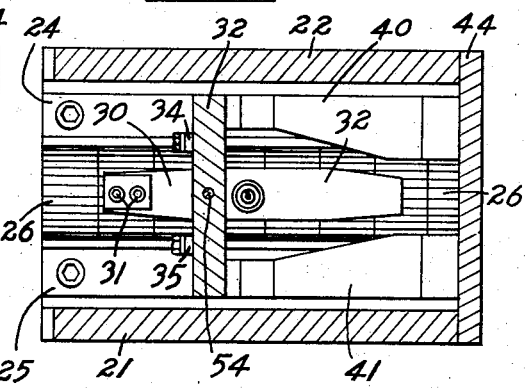
Fig. 7
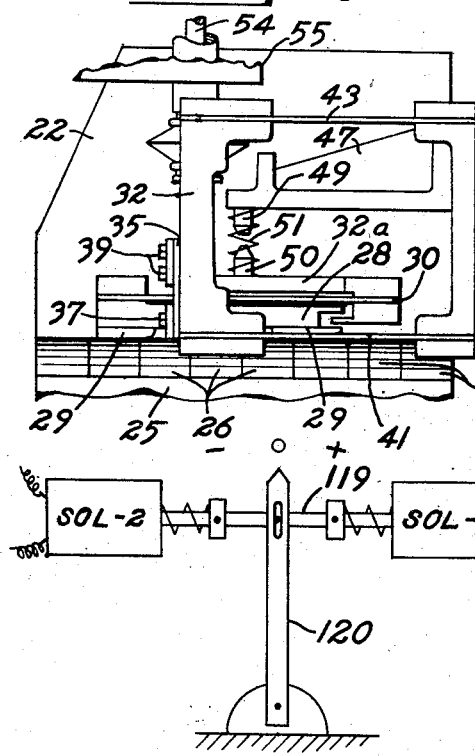
Fig. 8
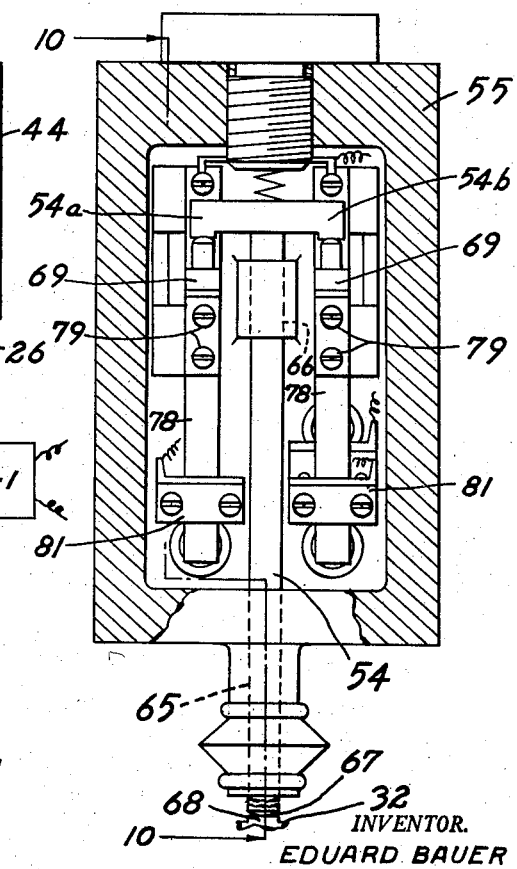
Fig. 9
INVENTOR.
EDUARD BAUER
BY
H. H. Parsons & L. N. Wright
ATTORNEYS.

Sept. 9, 1958     E. BAUER     2,850,805
GAUGING DEVICE
Filed Dec. 20, 1955     3 Sheets-Sheet 3
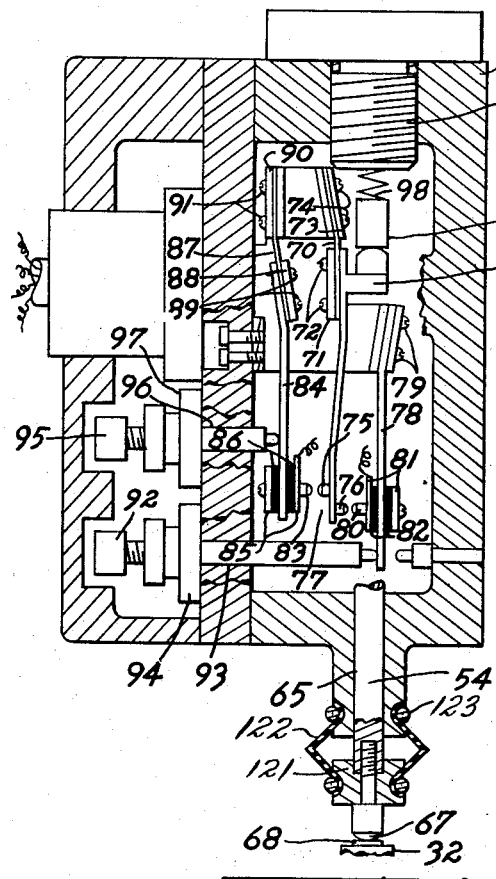
Fig.10
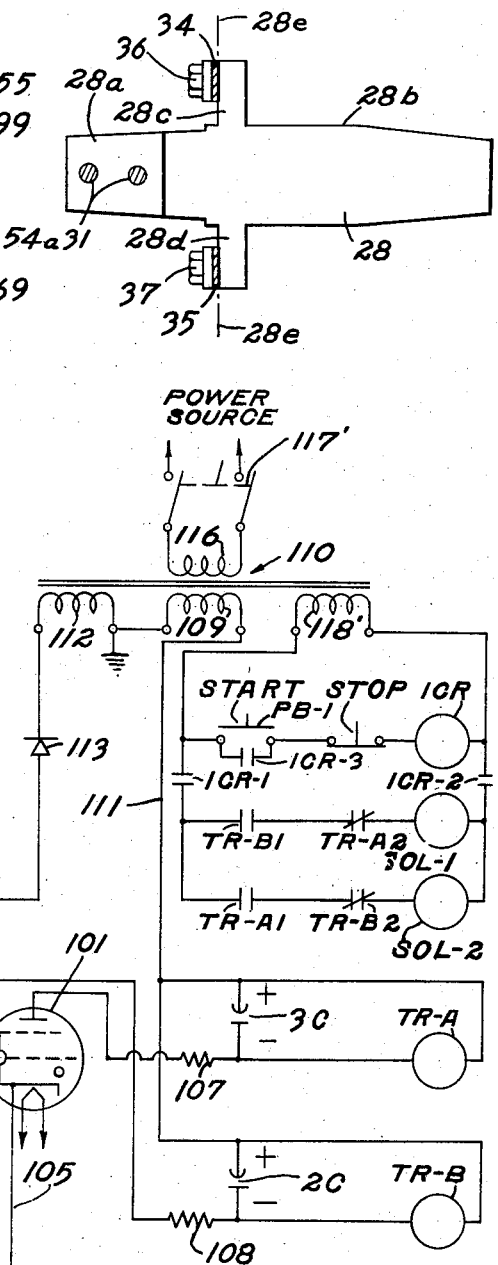
Fig.12
Fig.11
INVENTOR.
EDUARD BAUER
BY
N. N. Parsons & L. N. Wright
ATTORNEYS.

United States Patent Office 2,850,805
Patented Sept. 9, 1958

2,850,805

GAUGING DEVICE

Eduard Bauer, Cincinnati, Ohio, assignor to The Cincinnati Milling Machine Co., Cincinnati, Ohio, a corporation of Ohio Application December 20, 1955, Serial No. 554,191

16 Claims. (Cl. 33—147)

This invention relates generally to gauges and more particularly to a new and improved micro-sensitive electronic gauging device.

Through the years, machining tolerances, as employed and maintained by the machine tool and other allied industries, have progressively decreased. Today, with the growth and adaptation of modern machining methods to the production of articles of precision, tolerances have been reduced as low as a few millionths of an inch. Therefore, there is an ever-increasing demand for the development and utilization of precision instrumentation so that these micro-inch tolerances may be utilized more generally.

With the advancement of automatic processes employing highly productive machines that automatically receive, finish, and discharge a series of successive work pieces at a relatively fast rate, it is necessary to continually, or at least periodically, check the finished work for size deviations from a prescribed value. Since it is too slow to make these checks manually with micrometers, there is a demand for a gauging mechanism which will automatically check a continuous flow of work.

Therefore, one of the principal objects of this invention is to devise a new and improved micro-sensitive gauging mechanism for checking size deviations in a continuous flow of work.

Another object of this invention is to devise a micro-sensitive automatic gauging mechanism that is adaptable for checking a flow of successive work pieces at a relatively fast rate and indicate size deviations in the average size of the work passing through the gauge.

Still another object of this invention is to devise a new and improved micro-sensitive automatic gauging mechanism having a size averaging mechanism and new and improved electronic mechanism for automatically and continuously indicating variations from a predetermined size average to which the gauge is set.

Another object of this invention is to devise a micro-sensitive gauging mechanism for the purposes aforesaid which may be utilized alone as a bench gauge, or which may be coupled direct to a machine for receiving and gauging the flow of work therefrom.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

Referring to the drawings in which like numerals denote like or similar parts:

Figure 1 is an end elevational view of the gauge structure.

Figure 2 is a cross sectional view of the gauge structure taken along the line 2—2 in Figure 1.

Figure 3 is an end elevational view partly in section showing the work supporting structure as viewed along the line 3—3 of Figure 2.

Figure 4 is a diagrammatic representation of the "bell crank" mechanism as contained in the gauge head structure.

Figure 5 is a partial sectional view of the parallelogram-type strip spring suspension as viewed along the line 5—5 of Figure 2.

Figure 6 is a partial sectional view of the parallelogram-type strip spring suspension as viewed along the line 6—6 of Figure 2.

Figure 7 is a partial side elevational view showing the relationship between the parallelogram-type strip spring suspension and the suspended shoe mechanism as viewed along the line 7—7 of Figure 3.

Figure 8 is a sectional view of the bell-crank mechanism contained in the gauge head as viewed along the line 8—8 of Figure 2.

Figure 9 is a diagrammatic representation of the indicating mechanism of the gauge structure.

Figure 10 is a sectional view of the gauge head showing the bell crank mechanism and adjusting means therefor as viewed along the lines 10—10 of Figure 8.

Figure 11 is a schematic wiring diagram of the thyratron and electrical circuitry as employed by the gauging device.

Figure 12 is a plan view of the shoe member viewed along the line 12—12 in Figure 2.

According to this invention, the purposes aforesaid are accomplished by the unique construction of a gauging mechanism which is adaptable for receiving a plurality of successive end-to-end work pieces which enter said gauging mechanism by way of a trough-like work support and thereupon engage a "feeler" element of a size sensing mechanism. The feeler is normally biased to a predetermined null position, the location of said null position being determined by the desired predetermined size to which the work pieces should conform. If the size of the incoming work pieces is above or below said predetermined value, the feeler will be deflected either plus or minus with respect to said null position.

Since it is desired that the gauge feeler be deflected in accordance with the amount of change in the average size of a plurality of successive work pieces rather than the change in size of one individual work piece, the feeler is provided with a fulcrum supporting a pivotable shoe member which spans and is in simultaneous engagement with the periphery of a plurality of successive work pieces. If the shoe member is swung about its pivot by one out-of-size work piece so that one end moves down and the other end moves up no change is effected in the position of the pivot, and the feeler does not move. However, if all the work pieces increase or decrease in size, then both ends of the shoe will move in the same direction and thus move the feeler. The feeler is held in vertical suspension by means of a parallelogram type strip spring suspension, thus alleviating the possibility of lost motion inherent in journaled or the like constructions.

Since it is desired that the sensitivity of the gauge be in the order of a few millionths of an inch, the vertical deflection of the feeler is mechanically amplified. The type of mechanical amplifier found to be most desirable is of the simple bell-crank type which again alleviates the possibility of lost motion and backlash inherent in gear-type or the like mechanical amplifiers. The output lever arm of the bell crank amplifier terminates as the center terminal of a single pole-double throw switching mechanism having each of the two remaining outer terminals thereof serially connected to a control grid of a conventional thyratron type vacuum tube; the center terminal thereof being returned to ground potential.

Both thyratrons are normally biased to "cut-off" or non-conduction such that one or the other of the thyratron tubes will conduct depending upon whether the bellcrank lever arm has been deflected in one direction or the other, thereby closing one of said switches and thus returning the respective grid to ground potential. As each of the switching contacts is series connected in its respective grid circuit and as the normal magnitude of grid current flowing therein is in the order of a few microamps, it is obvious that the contact spacing of said switches can be in the order of a few millionths of an inch and still not be plagued with undesired contact arcing or sparking.

Each thyratron operatively energizes one of two solenoids which in turn are connected in diametrically opposed relation to an indicating means such that if the average size of the workpieces is greater than the predetermined value, one of the thyratrons will conduct and will energize its respective solenoid which in turn will deflect the indicating means in one direction to indicate oversize. Conversely, if the average size of the work pieces is less than the predetermined value, the first thyratron tube will be rendered non-conductive and the remaining thyratron will be rendered conductive and will energize its respective solenoid which, in turn, will deflect the indicating means in the opposite direction to indicate undersize. Therefore, it can be seen that there has been provided an extremely sensitive gauging device that will detect even a minute change in work size from the desired predetermined value.

With reference to Figures 1, 2, and 3 of the drawings, the gauging mechanism consists essentially of a base 20 supporting two parallel upright sides 21 and 22 affixed thereto in any suitable manner. A rectangular work supporting means or anvil 23 is mounted on the base 20 and extending the full length of the base midway between a pair of parallel angles 24 and 25 which together form a trough-like work support for receiving and guiding a flow of end-to-end work pieces 26 therethrough for gauging. The side angles 24 and 25 are adjustably affixed to the base 20 by means of bolts 27 threaded therein so that their position may be adjusted to accommodate various diameters of work. The anvil 23 and sides 24 and 25 are preferably made of a hardened material having accurately machined and highly polished faces so as to decrease the wear thereon and to decrease the sliding frictional force on the work pieces to insure a free flow of work therethrough.

As mentioned heretofore, it is desired that the sensing mechanism be responsive to average change in size of the work pieces 26 rather than to a change in size of one individual work piece in a group. Therefore, as viewed in Figure 2 of the drawings, there has been provided a simple averaging mechanism consisting essentially of a horizontally disposed shoe 28, shown in plan in Figure 12, having pads 29 formed thereon in any suitable manner which have accurately machined and highly polished face surfaces adapted for engagement with the topmost periphery of a plurality of said work pieces 26 the average diameter of which it is desired to gauge. The shoe 28 is shown in Figure 12 and has a short portion 28a and a long portion 28b and between them are formed two wings or shoulders 28c and 28d. The shoulders are located at about one-third the length of the shoe. This shoe is supported by attaching flat springs or reeds 34 and 35 to the face of each respective shoulder, said reeds extending perpendicular to a shoe carrier 32 as shown in Figure 2. This forms a pivoting axis 28e crosswise of the shoe, and since the shoe is unbalanced because of its greater length on one side of the axis, it will sag down on the end that receives the work. The shoe 28 is also held against longitudinal movement by means of a horizontally disposed reed 30, Figure 2, having the left end thereof secured to the shoe 28 by screws 31 threaded therein and its opposite end secured to a horizontally disposed leg 32a (Figure 7) of its supporting carrier 32 by screws 33 (Figure 2) threaded therein.

The reeds 34 and 35, as shown in Figure 3 of the drawings, are connected to the shoulders of the shoe 28 by screws 36 and 37, respectively, threaded therein. The upper ends of the reeds 34 and 35 are attached to the carrier 32 by screws 38 and 39, respectively, threaded therein. Therefore, with reference to Figure 2, it can be seen that any small difference in size between the work pieces 26 entering the gauging mechanism at the right and the workpieces 26 leaving the gauging mechanism at the left will merely tilt the shoe 28 about its axis 28e. Therefore, the carrier 32 will remain stationary which is indicative that the average diameter of said work pieces 26 is within the desired limits.

It is desired that the deflection or movement of the carrier 32 be perpendicular to the contact surface of the anvil 23, and it is made H-shaped to provide connection to four horizontally disposed strip spring members, or reeds 40, 41, 42, and 43, shown in Figures 5, 6, and 7, which constitute the four legs of a parallelogram which constrain the movement to straight line. As viewed in Figure 3, the reeds 40, 41, 42, and 43 are connected to the lower left, lower right, upper left, and upper right legs respectively of the H-shaped carrier 32 by any suitable means. As viewed in Figure 1, the opposite ends of said reeds are connected to a backplate 44 by suitable screws threaded therein, the plate 44 being secured to the parallel sides 21 and 22 by screws 45 and 46 (Figure 1) threaded therein. By providing elongated slots 45' and 46', the plate and all parts including the shoe 28 supported thereby may be adjusted relative to the anvil to suit the work size to be checked.

A suitable stop limiting means has been provided to limit the upward deflection of the carrier 32 and consists essentially of a horizontally extending bracket 47 (Figure 2) secured to the plate 44 by means of screws 48 threaded therein. The bracket 47 terminates in a depending button 49 positioned in close proximity to a second button 50 formed on the carrier 32 and having a spring 51 interposed therebetween. Therefore, it can be seen that the maximum limit of deflection of the carrier 32 is governed by the spacing between the buttons 49 and 50. The maximum degree of tilting possible of the shoe 28 is governed by the action of a horizontal lip 52 formed on the carrier 32 positioned in a horizontal groove 53 formed on the right end of the shoe 28 as viewed in Figure 2 of the drawings.

Since it is desired that the sensitivity of the gauging mechanism be in the order of a few millionths of an inch, means have been provided to amplify the degree of deflection or movement of the carrier 32 caused by the work pieces 26. The amplifying means includes vertically disposed plunger 54 in contact with and actuated by the carrier 32. The mechanical amplifier is enclosed in a suitable housing 55 secured to a mounting bracket 56 by bolts 59 extending through elongated slots 58 formed in the bracket 56 and threaded in the housing 55. Resilient rubber washers 60 are mounted on the bolts 59 between the parts to provide mechanical damping for the amplifier to insure stability thereof in spite of any vibration of the gauging mechanism. The bracket 56 is secured to the uppermost portion of the vertical sides 21 and 22 by screws 61 and 62 respectively threaded therein. An adjusting screw 63 is threaded to the housing 55 in pressural contact with the bracket 56 so that the position of the housing 55 may be adjusted to any suitable height with respect to the bracket 56 depending upon the desired null position of the shoe 28, as will hereinafter be more fully described, and then may be locked in said adjusted position by action of lock nut 64.

With reference to Figures 8 and 10 of the drawings, the plunger 54 is shaped in a T-configuration and slidably mounted in bores 65 and 66 formed in said housing 55. The plunger 54 has been provided with a hardened and highly polished rounded end tip 67 threaded in the lower end thereof to insure a positive, non-frictional contact between the tip 67 and the hardened and polished surface on an anvil 68 provided on the carrier 32.

As shown in Figure 10, the tip 67 is provided with a threaded tenon which screws into a tapped hole provided in the lower end of the plunger 54 and thereby holds in place on the bottom of the plunger a collar 121 which is counterbored to receive the lower end of the plunger. To seal the bore 65 against the entry of dust or dirt, the lower end of the plunger, where it emerges from the housing 55, is covered by a bellows 122 formed of flexible material. As shown in the drawing, the upper end of the bellows is attached to the housing by a sealing and fastening ring 123 while the lower end thereof is attached by a similar ring to the collar 121.

The crossarms 54a and 54b of the plunger 54, as shown in Figure 8 of the drawings, are each in contact with and actuate a vertically suspended bell crank amplifier 69 of a contact closing mechanism. As only one mechanism is actually utilized for indicating purposes, the second contacting mechanism is provided for counterbalancing purposes. Of course, the second set may be utilized for control purposes not within the scope of this invention.

As viewed in Figure 10 of the drawings, the member 54a engages one leg of the bell crank member 69 which is suspended by means of a strip spring member or reed 70 attached thereto by plate 71 and screws 72 threaded therein. The upper end of the reed 70 is attached to the housing by a plate member 73 and screws 74 threaded therein. The lower end of the member 69 terminates in two electrical contacts 75 and 76. Actually, the member 69 and contacts 75 and 76 constitute the center terminal of essentially a single pole-double throw, micro-switching mechanism indicated generally by the reference numeral 77.

It can now be seen that vertical deflection of the T-shaped plunger 54 is amplified and converted to lateral deflection of the lower arm of the member 69; the degree of amplification being the ratio of the length of the vertical leg to the length of the horizontally disposed leg of said bell-crank member 69.

One outside terminal of said micro-switching mechanism 77 consists of a depending strip spring member 78 having the upper end thereof attached to the housing 55 by means of a clamping screw 79 threaded therein. The lower end of the strip spring member 78 carries an electrical switch contact 80 which is connected thereto by plates 81 but electrically insulated therefrom by insulators 82 interposed therebetween. The other switch contact 83 is connected to a vertically suspended member 84 by action of plates 85 but electrically insulated therefrom by insulating washers 86 interposed therebetween. The member 84 is held in vertical suspension by means of a strip spring member 87 connected thereto by plate 88 and screws 89 threaded therein. The upper end of said spring 87 is secured to the housing 55 by plate 90 and screws 91 threaded therein.

Adjusting means have been provided for adjusting the null position of the plunger 54 by adjusting the spacing between the micro-switch contacts 76 and 80 and consists essentially of a micrometer adjusting screw 92 journaled in a bore 93 formed in the housing 55 and threaded in a member 94 which is fixed to the housing 55 by any suitable means. As shown, the right end of the adjusting screw 92 engages the lower end of member 78 in such a manner that the lateral position of the switch contact 80 may be adjusted with respect to contact 76 by forcing the contact 80 to the right against the tension of the spring 78 which normally tends to deflect the contact 80 to the left. A second adjusting means has been provided for adjusting the spacing between contacts 75 and 83, and consists essentially of a second micrometer adjusting screw 95 also journaled in a bore 96 formed in the housing 55 and threaded in a nut member 97 fixed to the housing 55 by any suitable means.

As viewed, the right end of the screw 95 engages the member 84 to adjust the spacing between micro-switch contacts 75 and 83 by forcing the contact 83 to the right, as shown, against the tension of the spring 87 which normally tends to deflect the contact 83 to the left. Constant pressure is exerted on the crank 69 by the plunger 54 at all times by means of a spring 98 interposed between said plunger 54 and an adjusting screw 99 threaded in the upper end of the housing 55, but movement of plunger 54 is limited by engagement with part 68 on member 32. Therefore, the adjusting screws 92 and 95 may be utilized to centralize the position of the center contacts 75 and 76 with respect to the contacts 80 and 83 and thus establish a null position for the T-shaped plunger 54.

With reference to Figure 11 of the drawings, center terminals 75 and 76 of the switching mechanism 77 are connected electrically to ground potential by way of conductor 100 whereas terminals 80 and 83 are connected to the control grids of conventional thyratron tubes 101 and 102 through resistors 103 and 104 respectively. The cathodes of said tubes 101 and 102 are returned to ground potential through conductors 105 and 106 respectively, whereas the plates thereof are series connected respectively to relay coils TR–A and TR–B through current limiting resistors 107 and 108 respectively. The remaining terminals of the relay coils TR–A and TR–B are connected together and returned to one terminal of a plate supply secondary winding 109 of a power transformer 110 by way of conductor 111. The other terminal of the secondary winding is connected to ground.

The tubes 101 and 102 are normally biased to "cut off" or non-conduction by means of a negative voltage derived from a grid supply secondary winding 112 of said power transformer 110 one terminal of which is connected to ground and the other terminal of which is connected to one terminal of a selenium or other similar type rectifier 113. The other terminal of the rectifier is connected to ground through a resistor 114 and condenser 115. Current flowing through the resistor 114 charges the condenser 115 to the peak voltage supplied by the secondary winding 112 and provides sufficient negative bias to the grids of the tubes 101 and 102 through resistors 117 and 118 to prevent the tubes from firing. The primary winding 116 of transformer 110 is connected to a source of alternating current upon closure of the series connected power switch 117′, thereby energizing the secondary windings thereof.

It can be seen that the micro-switch contacts 76 and 80 are in series with the grid circuit of the tube 101, whereas the micro-switch contacts 75 and 83 are in series with the grid circuit of tube 102, and as the magnitude of the grid current flowing in said circuits is in the order of a few microamperes it is evident that the spacing between said contacts can be made extremely small or of the order of a few micro-inches, before the ionization potential of the gaps is exceeded, and also due to the small grid current there is the additional characteristic of not being plagued with arcing or sparking between the gaps during opening and closing thereof. It can also be seen that since the tubes 101 and 102 are normally biased to cut-off or non-conduction, if the contacts 76 and 80 are closed by action of the work pieces 26 on plunger 54, the grid of tube 101 will be returned to ground potential and the tube 101 will conduct and energize the relay coil TR–A; whereas if contacts 75 and 83 are closed, thus returning the grid of tube 102 to ground potential, tube 102 will then conduct and energize relay coil TR–B. In either case, the current flowing through the contacts is kept quite small due to the high ohmic resistance of the resistors 117 and 118 which may be 500,000 ohms or more.

A control circuit has been provided which is energized by a third secondary winding 118' of the power transformer 110 in which a "start" push button PB-1 is connected for actuation of a relay coil 1CR which will be energized upon closing of the push button to close the latch contacts 1CR-3 to maintain the relay coil 1CR energized when the push button PB-1 has been released. The relay coil 1CR also closes contacts 1CR-1 and 1CR-2 to energize the rest of the circuit. Therefore, when relay coil TR-A is energized, its normally open contacts TR-A1 in the control circuit will be closed and its normally closed contacts TR-A2 will be opened. When the relay coil TR-B is energized, its normally open contacts TR-B1 will be closed and its normally closed contacts TR-B2 will be opened. Therefore, it can be seen that the solenoids SOL-1 and SOL-2 connected respectively to TR-A2 and TR-B2 cannot be energized at the same time.

With reference to Figure 9 of the drawings, the solenoids SOL-1 and SOL-2 have their actuating plungers mechanically coupled together to a common tie rod 119 in such a manner that when solenoid SOL-1 is energized and solenoid SOL-2 is deenergized, the rod 119, and thus the pointer 120, will be deflected to the right as viewed to indicate that the work is oversized, whereas when solenoid SOL-1 is deenergized and solenoid SOL-2 is energized the rod 119 will be deflected to the left to indicate that the work is undersized. It is evident that the solenoids SOL-1 and SOL-2 could also be connected to a conventional hydraulic reversing valve or the like for controlling the rotation of a hydraulic motor or the like, which in turn could be utilized to automatically make the necessary feeding adjustments on the machine to compensate for work size deviations from a predetermined value due to wheel wear, etc., as in a centerless grinding machine or the like.

Suppose now that it is desired, for example, to check the diameter of a series of one inch work pieces to determine if the size thereof is within a specified tolerance of say plus or minus twenty millionths of an inch. Therefore, a standard gauge block having a size of one inch minus twenty millionths of an inch and long enough to contact both pads 29 on the shoe 28 would be inserted in the work trough of the gauging mechanism, and the micrometer screw 92 adjusted until the gap between the contacts 76 and 80 has just closed, thereby grounding the grid of the thyratron tube 101 and effecting energization of the relay coil TR-A which, in turn, effects energization of the solenoid SOL-2 and thus the pointer 120, Figure 9, will be moved to the left, thus indicating that the size thereof is undersized by an amount equal to twenty millionths of an inch. The said standard gauge block is then removed and a second gauge block inserted therein in its stead and having a size equal to one inch plus twenty millionths of an inch. The micrometer adjusting screw 95 is adjusted until the contacts 75 and 83 have just closed, thereby returning the grid of the thyratron tube 102 to ground potential and causing energization of the relay coil TR-B, which, in turn, effects energization of solenoid SOL-1, which, in turn, moves the pointer 120 to the right to indicate that the size thereof is oversized by an amount equal to twenty millionths of an inch.

Therefore, it can be seen that the gauging mechanism is balanced and now ready for operation and the indicating mechanism will indicate whether the average size of the incoming one inch work pieces is within the prescribed tolerance of plus or minus twenty millionths of an inch.

Therefore, it is now evident that I have devised a new and improved ultra-sensitive electronically controlled gauging device for the purposes disclosed.

What is claimed is:

1. A gauging mechanism for checking the diameter of circular work pieces and the like, the combination of a frame having a support for supporting a plurality of work pieces on one side of their periphery in abutting end to end relation, an elongated shoe for contacting the periphery of several of the work pieces simultaneously, a shoe carrier resiliently mounted on the frame for movement to and from the work support, means to pivotally attach the shoe to said carrier at a point of unbalance in the shoe, a spring actuated axially movable plunger engaging said carrier to press the shoe against the work, a bell crank pivoted to the frame having a short arm actuable by said plunger and a long arm carrying a switch contact, said contact being interposed between switch contacts of two control circuits, and means selectively operable by said circuits to indicate plus or minus variations of the work.

2. A gauging mechanism for checking the average size of a predetermined number of work pieces comprising a frame, a work holder having a gauging anvil for supporting a plurality of aligned circular work pieces, an averaging shoe supported in opposition to the anvil and adapted to engage the periphery of a predetermined number of aligned work pieces simultaneously whereby, when all of said work pieces are the same size, the shoe will be parallel to said anvil, a supporting carrier overlying said shoe and normal to the extent thereof, said shoe having a pivotal connection at an off-center point with respect to its length to said supporting carrier, whereby a sporadic unevenness in the work will tilt the shoe, a plurality of cantilever springs extending from said frame substantially parallel to said anvil having their ends attached to said carrier for resiliently supporting said carrier and shoe for confined movement to and from the work support, a plunger resting on said carrier in approximate alignment with said pivot whereby movement of the pivot will impart axial movement to the plunger but oscillation of the shoe will not, and a three position switching mechanism having a center open position, operatively connected to said plunger and held thereby in said open position when the average of the work is of desired size.

3. In a microsensitive device of the class described having a base, and a work supporting means thereon for receiving a succession of work pieces, the combination of an elongated shoe having means for simultaneous engagement with one side of said work pieces opposite to said work support for determining the cross sectional dimension thereof, a suspended carrier attached to said base having a pivotal connection with said shoe at a point which supports said shoe in unbalanced relation for oscillation by the work so as to deflect said carrier by an amount proportional to the algebraic sum of the deflections of the ends of said shoe, a switch housing mounted on said base having a pivoted microswitch to provide a null position and operative positions on either side thereof, switch actuating means in the housing including a plunger abutting said carrier, means to adjust said housing toward and from the work support to position said switch in its null position while operatively connected to said carrier, operating electrical circuits connected to said contacts, means responsive to energization of one of said circuits for indicating the work is undersize, and means responsive to energization of the other circuit to indicate that the work is oversize.

4. In a microsensitive gauging device of the class described, having a base and a work support mounted thereon for receiving and supporting a series of round work pieces in end to end relation, the combination of an elongated shoe overlying said support and having means for engaging the periphery of spaced pieces of said series, a shoe carrier attached to said support providing a suspended pivot operatively connected to said shoe whereby said carrier will be deflected an amount proportional to the algebraic sum of the deflections of the ends of said shoe, switch actuating means mounted on said base including an axially moving plunger, one end of which is in contact with said carrier in alignment with said pivot for movement by said shoe, an adjustable support for said switch actuating means mounted on said base, a pivoted bell crank switch having one leg in operative engagement with said plunger and having a neutral position, means to adjust said support to position the switch in a neutral position when the shoe is positioned at the desired dimension to be checked, a first micro-switching means on one side of said neutral position for closure by said plunger upon movement thereof to an oversize position, a second microswitching means on the other side of said neutral position and adapted to be closed by said plunger upon movement to an undersize position, indicating means including a pointer having a neutral position and movable to opposite sides thereof to indicate that the work is above or below the desired dimension, reversible power operable means for actuating said pointer and separate control circuits connecting said microswitching means to said power operable means for alternative actuation thereof.

5. In a microsensitive gauging device of the class described having a base and an elongated work receiving and supporting member thereon for holding a series of work pieces simultaneously in end to end relation, the combination of a shoe having spaced means for simultaneous engagement with spaced pieces of said series, a carrier overlying said shoe, a parallelogram type flat spring suspension means attached to said carrier and connected to said base for pivotally supporting said carrier for movement toward and from the work, said carrier providing a pivot for said shoe whereby oscillation of said shoe about its pivot will not cause movement of said carrier but oscillation about either end of said shoe will effect movement of said carrier, a switch housing adjustably attached to said base, an axially movable plunger carried by said housing and resiliently maintained in abutting relation to said carrier, a pivoted switch carried by said housing and operatively connected to said plunger for receiving movement therefrom, said switch having a neutral position and adapted to be swung to operative positions on either side thereof, means to adjust said housing to position said switch in a neutral position when said shoe is positioned at the desired dimension to be checked from said work support, power operable indicating means for indicating whether the work is above or below size, and separate circuits adapted to be selectively closed by said switch means for actuating said indicating means.

6. In a microsensitive gauging device having a base and an elongated work support having a work receiving end for holding a plurality of work pieces simultaneously in end to end relation for gauging purposes, the combination of an elongated shoe overlying said support and having means for engaging the periphery of spaced pieces of said series, a carrier resiliently supported by said base in overlying relationship to said shoe, said shoe having a pivotal connection to said carrier at a point therealong further from said work receiving end than from the other end whereby pivotal movement of said shoe about either end thereof will cause movement of said carrier, an axially movable plunger engaging the center of said carrier opposite said pivot and responsive to movement thereof, pivoted switch means operatively connected to said axially movable plunger for oscillation in response to movement thereof, said switch means haaving a neutral position and contacts on either side thereof, a reversible power movable indicator, and separate circuits connecting said contacts to said indicator to alternatively effect opposite movements thereof.

7. In a microsensitive gauging device having a base and a longitudinal work support mounted on the base for holding a series of work pieces in end to end relation, the combination of an elongated shoe having means for engaging spaced pieces of said series, a carrier for said shoe resiliently supported on said base and carrying a pivot operatively connected to said shoe at a point off center with respect to its length, means to adjust the shoe carrier toward and from the work support in accordance with the desired size of the work, an axially movable plunger engaging said shoe carrier in overlying relation to said pivot whereby oscillation of said shoe about its pivot will not cause movement of the plunger but oscillation of the shoe about either end thereof will cause movement of the plunger, a control switch operatively connected to the plunger for movement thereby, said switch being mounted in a separate support for relative adjustment with respect to said plunger, said switch being oscillatable to opposite sides of a neutral position, an indicator having a central position and movable to opposite sides thereof to indicate that the size of the work is greater or less than the predetermined setting of said shoe carrier, separate power operable means for moving the indicator to either side of its central position, a first control circuit closed by movement of the switch means to effect actuation of the indicator in one direction, and a second control circuit adapted to be closed by said switch to move the indicator to the other side of its central position.

8. In a microsensitive gauging device, having a base and an elongated work support adapted to hold a series of work pieces simultaneously in end to end relation, the combination of an elongated shoe having spaced means for simultaneously engaging the periphery of spaced work pieces in said series and at a point thereon diametrically opposite the work support, a shoe carrier resiliently supported on said base by a plurality of spring members extending substantially parallel to said work support, said shoe carrier having a pivotal connection to said shoe at a point to one side of the center of its length, means to adjust the shoe carrier in accordance with the size of the work so that the shoe will lie parallel to the work support, a plunger axially movable and resiliently held in engagement with said shoe carrier opposite said pivotal connection whereby oscillation of said shoe about its pivot will not cause movement of the plunger, but unequal movements of opposite ends of the shoe by the work will cause movement of the plunger by an amount proportional to the algebraic sum of the deflections of the ends of said shoe, a switch housing, a pivoted switch carried by said housing having a short arm operatively connected to said plunger and a long arm oscillatable between two switch contacts, means to adjust said housing to position said switch relative to said plunger so that the long arm is in a midposition between said contacts, and electrical means operated by said switch for indicating whether the work is oversize or undersize.

9. In a microsensitive gauging device having a base and an elongated work support for holding several work pieces in end to end relation, the combination of an elongated shoe extending lengthwise of said support and overlying said work, said shoe having spaced means thereon for engaging spaced work pieces in said series, a shoe carrier resiliently supported by said base by a plurality of spring members extending parallel to said support, said carrier having a pivotal connection operatively connected to said shoe at an off-center position therealong, a T-shaped plunger axially slidable with one end in engagement with said carrier for movement thereby in response to uneven pivoting of said shoe, a switch housing, a bell crank switch member mounted in said housing and having a short arm in engagement with the cross member of said T-shaped plunger, said bell crank member being pivoted for movement to opposite sides of a center position, means to adjust said housing relative to said T-shaped plunger to position said switch in its central position, first and second microswitch contacts for alternative closure by said bell crank member in response to deviations of said T-shaped plunger caused by over- or undersized work, indicating means electrically connected to said contacts and including means responsive to energization of said contacts for indicating whether the work is over- or undersize.

10. In a microsensitive gauging device having a base, and an elongated work support for holding a series of successive work pieces in end-abutting relation, a size gauging shoe overlying the support having spaced means for engaging spaced apart work pieces, said work support having a work receiving end and a work exit end, a carrier suspended by a parallelogram type strip spring suspension means for movement perpendicular to said work support, one end of said means being attached to said carrier and the other end to said base, said carrier carrying a pivot operatively connected to said shoe at a point further from the work receiving end than the other end whereby incoming work pieces of non-uniform dimension will cause pivoting of said shoe about its opposite end but will move said carrier by an amount less than the amount of the non-uniformity of said work, a plunger axially urged into engagement with said support and having a crossarm thereon, a switch housing, oscillatable switch means having one leg in engagement with the crossarm on said plunger for actuation thereby, and a second leg positioned between switch contacts, and electrically operable indicating means connected by separate circuits to said contacts for reversible operation upon alternative energization of said contacts.

11. A gauging mechanism for checking the average diameter of a plurality of work pieces comprising an elongaged work support for receiving a plurality of work pieces in abutting end to end relation, an elongated shoe overlying said work support for contacting the surfaces of a plurality of the work pieces simultaneously, a carrier supported for movement to and from the work support, a pivotal connection between said shoe and said carrier for suspending said shoe from said carrier at a location intermediate the ends of said shoe, a spring-biased plunger bearing against said carrier adjacent said pivotal connection for sensing movements of said shoe produced by the work pieces, and means actuated by said plunger for indicating the average size of the plurality of work pieces contacted simultaneously by said shoe.

12. The gauging mechanism of claim 11 including means for limiting the extent of pivotal movement of said shoe on said carrier.

13. The gauging mechanism of claim 11 wherein said pivotal connection includes a flexible reed connecting said shoe to said carrier.

14. The gauging mechanism of claim 13 wherein said carrier is supported for movement to and from said work support by a parallelogram reed-type suspension.

15. The gauging mechanism of claim 11 wherein said indicating means includes a pivoted bell crank having a short arm engaged by the plunger and a long arm carrying electrical contacts.

16. The gauging mechanism of claim 15 wherein the pivot for said bell crank comprises a flexible reed.

References Cited in the file of this patent
UNITED STATES PATENTS
2,382,885     Landay et al. _ _ _ _ _ _ _ _ _ _ _ Aug. 14, 1945